United States Patent [19]

Massey et al.

[11] Patent Number: 4,626,352
[45] Date of Patent: Dec. 2, 1986

[54] VESSEL STRAINER

[76] Inventors: Simon C. Massey; Rowland W. Massey, both of 21 Church St., Beaumaris, Victoria 3193, Australia

[21] Appl. No.: 705,136

[22] Filed: Feb. 25, 1985

[30] Foreign Application Priority Data

Feb. 28, 1984 [AU] Australia ............................. PG3812

[51] Int. Cl.$^4$ ...................... B01D 35/02; B01D 35/28
[52] U.S. Cl. .................................... 210/469; 210/475; 210/477; D7/354
[58] Field of Search ............... 210/467, 468, 475, 477, 210/464, 465, 469, 473, 474; 99/408, 413; 126/369; 219/386; D7/327, 354

[56] References Cited

U.S. PATENT DOCUMENTS

| 254,500 | 3/1882 | Obermann | 210/467 |
|---|---|---|---|
| 478,365 | 7/1892 | Rerrich | 210/467 |
| 630,414 | 8/1899 | Schwartz | 210/467 |
| 971,781 | 10/1910 | Pearce | 210/467 |
| 1,314,180 | 8/1919 | Ayres | 210/464 |
| 1,994,576 | 3/1935 | Dean | 210/469 |
| 2,185,897 | 1/1940 | Krause et al. | 210/469 |
| 2,240,454 | 4/1941 | Badaracco | 210/469 |
| 2,303,841 | 12/1942 | Kircher | 210/469 |
| 2,840,239 | 6/1958 | Wethammer | 210/467 |
| 3,065,855 | 11/1962 | Edwards | 210/469 |
| 4,220,534 | 9/1980 | Perry | 210/475 |
| 4,310,418 | 1/1982 | Busbey | 210/467 |

OTHER PUBLICATIONS

Good Housekeeping, "Simple Kitchen Gadgets that Do a Big Job", Dec. 1973, p. 168.

Primary Examiner—Richard V. Fisher
Assistant Examiner—Wanda L. Millard
Attorney, Agent, or Firm—Diller, Ramik & Wight

[57] ABSTRACT

A vessel has a side wall, a rim extending about the side wall defining a top opening of the vessel, and an abutment shoulder is provided adjacent the rim. A lid is provided covering the top opening to close the vessel. A straining skirt extends about and depends from the lid. The skirt has a terminal edge region spaced from the lid and at least one perforated straining zone through which vessel contents can be strained from the vessel. When the lid closes the vessel, the straining skirt is spaced inwardly of the vessel side wall and the lid can be lifted clear to open the vessel without interfering engagement between the straining skirt and vessel. Additionally, the lid can be pivoted away from the vessel to partially open the vessel by pivoting the lid immediately adjacent the abutment shoulder and across from the straining zone with the rim acting as a fulcrum. That pivoting causes the straining zone to move out of the vessel and the terminal edge region to interferingly engage the vessel side wall so that the lid and straining skirt are jammed between the shoulder and side wall. This positively holds the lid in a position partially opening the vessel so that the vessel together with the lid and straining skirt can be tilted to strain vessel contents through the straining zone.

10 Claims, 5 Drawing Figures

VESSEL STRAINER

This invention relates generally to the straining of contents of a vessel. In particular, the invention concerns a lid and straining element combination for a vessel holding liquid and solid contents which allows straining of the liquid from the solids, and also such a combination when incorporating the vessel. The invention is applicable to kitchen utensil vessels, including saucepans, and it will be convenient to hereinafter disclose the invention in relation to that exemplary application. It is to be appreciated, however, that the invention is not limited to that application but may be equally applicable to other vessels, including those not being for kitchen or domestic use.

Preparation of foods in saucepans and other kitchen vessels often involves separation of liquids and solids, such as when food solids are cooked in water within a saucepan. One traditional method of achieving separation has been to slightly lift a lid on the saucepan to partially open that saucepan and then tilt the saucepan and lid together so that the liquid drains away whilst the solids are retained within the saucepan. This method requires coordinated two-handed manipulation of the saucepan and lid for proper and complete separation. Unfortunately, however, not everyone has that manipulative ability with a result of solids lost from the saucepan. In addition, when the saucepan contents are hot and steaming, rising steam can sometimes scald the hand holding the slightly lifted lid so this method may not be entirely safe for the saucepan holder.

To alleviate these disadvantages, an alternative method has been used whereby the saucepan contents are tipped into a separate colander or sieve, the liquid draining away to leave the solids in the colander or sieve. Although separation is more complete and the risk of being scalded reduced, this method necessitates an additional kitchen vessel and commensurate costs and cleaning up associated therewith. Moreover, this separation method still generally requires a two-handed operation, one hand to hold each of the saucepan and colander or sieve.

It is an object of the present invention to provide a relatively simple combination lid, and straining element for a vessel which will alleviate these foregoing disadvantages. It is also an object to provide a combination vessel, lid, and straining element which permits safe and proper straining of contents held within the vessel.

It is another object of the present invention to provide a combination vessel, lid, and straining element which can be used alternatively as a traditional vessel and lid and to strain contents held within the vessel.

It is a further object of the present invention to provide a vessel, lid, and straining element combination which may allow straining of vessel contents to be conducted one-handed.

With the above objects in mind, the present invention provides in one aspect a combination for a vessel having at least one side wall and a rim extending about the side wall defining a top opening of the vessel, the combination including: a lid for covering the top opening to close the vessel, the lid having a peripheral edge region bearing on the rim when closing the vessel; and, a straining element extending at least partially about and depending from the lid adjacent the peripheral edge region, the straining element having at least one perforated straining zone through which vessel contents can be strained from the vessel, the straining element being spaced inwardly of the vessel side wall when the lid closes the vessel whereby the lid can be lifted clear of the vessel without interfering engagement between the straining element and vessel to completely open the vessel, and whereby the lid can also be pivoted away from the vessel to partially open the vessel, the lid being pivotable about a portion of the peripheral edge region located across the lid from the straining zone with the rim acting as a fulcrum for the peripheral edge region, pivoting of the lid causing the straining zone to move out of the vessel and the straining element adjacent the straining zone to interferingly engage the vessel side wall so that the straining zone generally extends between the pivoted lid and partially open vessel, whereupon the vessel together with the lid and straining element can be tilted to strain vessel contents through the straining zone.

In another aspect, the present invention provides a combination, including: a vessel having at least one side wall and a rim extending about the side wall defining a top opening of the vessel; a lid for covering the top opening to close the vessel, the lid having a peripheral edge region bearing on the rim when closing the vessel; and, a straining element extending at least partially about and depending from the lid adjacent the peripheral edge region, the straining element having at least one perforated straining zone through which vessel contents can be strained from the vessel, the straining element being spaced inwardly of the vessel side wall when the lid closes the vessel whereby the lid can be lifted clear of the vessel without interfering engagement between the straining element and vessel to completely open the vessel, and whereby the lid can also be pivoted away from the vessel to partially open the vessel, the lid being pivotable about a portion of the peripheral edge region located across the lid from the straining zone with the rim acting as a fulcrum for the peripheral edge region, pivoting of the lid causing the straining zone to move out of the vessel and the straining element adjacent the straining zone to interferingly engage the vessel side wall so that the straining zone generally extends between the pivoted lid and partially open vessel, whereupon the vessel together with the lid and straining element can be tilted to strain vessel contents through the straining zone.

This invention is described and defined herein with reference to the vessel in a normal use orientation on a horizontally extending support surface, and terms such as "top" and "bottom" should be construed in the light of this orientation. However, it is to be appreciated that other orientations may be equally possible and that consequential changes in terms such as those above may be required in the light of those other orientations for a proper and complete understanding of the invention.

The straining element preferably has a terminal edge region spaced from the lid. Moreover, the straining zone is preferably located between the lid and that terminal edge region. It is the terminal edge region which preferably interferingly engages the vessel side wall. The engagement is preferably adjacent the rim.

The terminal edge region is preferably shaped to engage with the vessel side wall along a portion which corresponds to at least a substantial extent of the straining zone, when the lid is pivoted to partially open the vessel. That portion of the terminal edge region which engages the vessel side wall may be curved inwardly from the straining zone. In this way, upon pivoting of the lid to partially open the vessel, that portion of the terminal edge region arcs into face-to-face engagement with the side wall.

The vessel preferably also has an abutment shoulder provided adjacent the rim. The portion of the peripheral edge region about which the lid can be pivoted is preferably located immediately adjacent the shoulder when the lid closes the vessel. In this way, upon pivoting, the peripheral edge region preferably abuts against the shoulder and the straining element engages the vessel side wall. As a result, the lid and straining element tend to jam between the shoulder and side wall and this positively holds the lid in a position partially opening the vessel. This permits tilting of the vessel with one hand to strain the vessel contents without having to hold the lid with the other hand. The shoulder may be provided by a lip projecting upwardly from the rim and inwardly toward the top opening. Thus, when the lid is in position partially opening the vessel, the peripheral edge region of the lid is held securely between the lip and rim.

The straining element is preferably a straining skirt. Moreover, the or each straining zone preferably comprises a set of apertures in the skirt through which vessel contents can be drained upon vessel tilting. The straining element may extend approximately halfway about the peripheral edge region of the lid, and a single straining zone may be provided centrally of the straining element. Alternatively, the straining element may extend entirely about the peripheral edge region of the lid, and at least two straining zones may be provided at equally spaced locations about the straining element, the lid being locatable on the vessel to allow straining of vessel contents through any one selected straining zone.

The following description refers to a preferred embodiment of the various features of the combination of the present invention. To facilitate an understanding of the invention, reference is made in the description to the accompanying drawings where the combination is illustrated in the preferred embodiment. It is to be appreciated that the combination of the present invention is not limited to the embodiment as hereinafter described and illustrated in the drawings.

Figure 1:
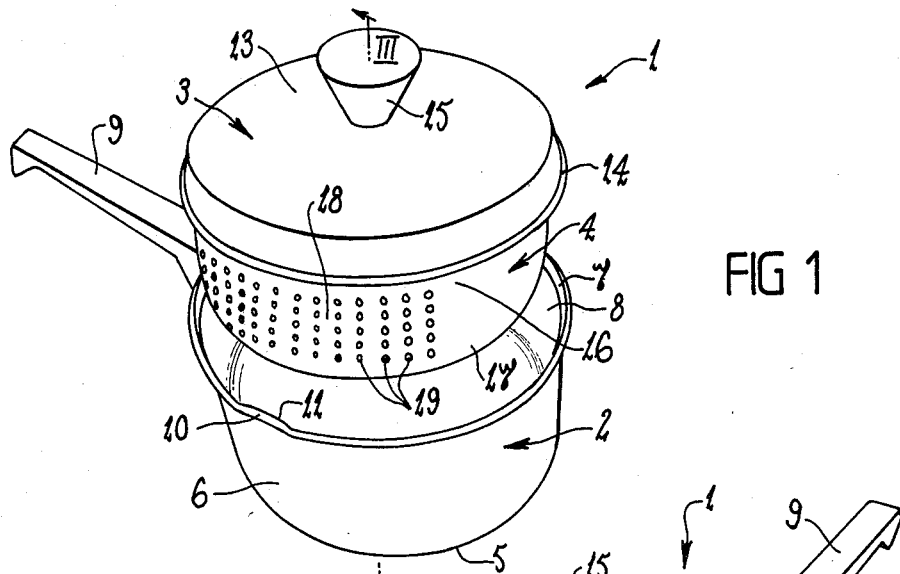
FIG. 1 is a top perspective view of a vessel, lid, and straining element combination according to a preferred embodiment of the present invention, with the vessel completely open.
Figure 2:
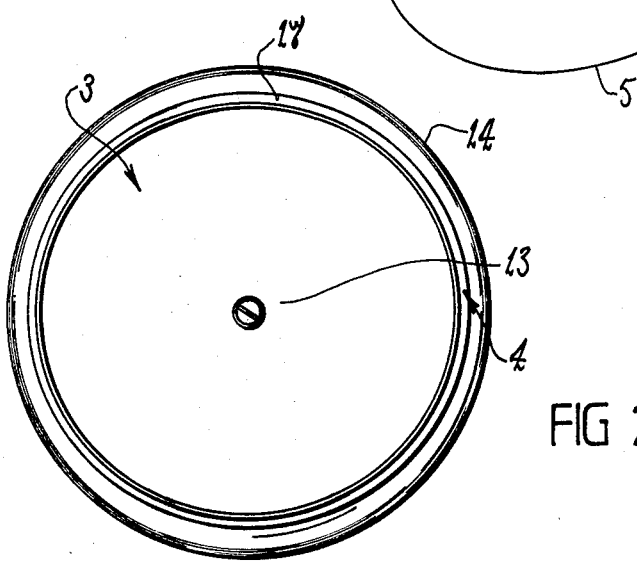
FIG. 2 is a bottom plan view of the lid and straining element of the combination of FIG. 1.

Referring initially to FIGS. 1 and 2, there is generally illustrated combination 1, including vessel 2, lid 3, and straining skirt 4. Vessel 2, is generally cylindrical in shape and lid 3, and straining skirt 4, correspondingly shaped although it will be appreciated that other shapes may be equally suitable.

Vessel 2, has planar bottom wall 5, and side wall 6, upstanding therefrom. In addition, vessel 2, has rim 7, extending about an upper periphery of side wall 6, and this defines top opening 8, to vessel 2. Vessel 2, conveniently also has handle 9, attached to side wall 6, and projecting laterally therefrom for manual gripping by a user to hold and manipulate vessel 2. Vessel 2, further has lip 10, extending about and upstanding from rim 7. This lip 10, extends endlessly about rim 7, in this embodiment although alternatively may extend only partly or intermittently about rim 7. In this embodiment, bottom wall 5, side wall 6, rim 7, and lip 10, are of an integral unitary construction but it will be appreciated that they may be of a separate fabricated construction so that, for example, lip 10, may be separately manufactured and secured to side wall 6, or rim 7.

At one or more locations 11, about rim 7, lip 10, is deflected inwardly over rim 7, toward opening 8, so as to provide shoulder 12, immediately adjacent rim 7. Conveniently, the or each location 11, is spaced from handle 9, such as about 90° around rim 7, from handle 9. A pair of opposite locations 11, may be provided.

Lid 3, covers and uncovers top opening 8, to respectively close and open vessel 2, as desired. Lid 3, includes central cover region 13, and peripheral edge region 14, extending thereabout. In closing vessel 2, with lid 3, peripheral edge region 14, bears on rim 7, and central cover region 13, extends over top opening 8. Peripheral edge region 14, also fits within lip 10, to assist retention of lid 3, on vessel 2. Lid 3, conveniently also has handle 15, for manual gripping during movement to cover and uncover top opening 8.

Straining skirt 4, extends about and depends from lid 3, adjacent peripheral edge region 14. To that end, straining skirt 4, may be formed integral with lid 3, or separately fabricated and then fixed to central cover region 13. Straining skirt 4, has body region 16, merging into a terminal edge region 17, spaced from lid 3. Body region 16, is generally cylindrical whilst terminal edge region 17, generally curves, tapers, or otherwise extends inwardly from body region 16.

Body region 16, provides at least one straining zone 18, through which vessel contents can be strained during use of combination 1. A pair of straining zones 18, may be provided as shown, each comprising a set of straining apertures 19, differently sized apertures 19, in respective zones 18. Each straining zone 18, extends approximately 120° about body portion 16, although other zone extents may be equally possible. Where a plurality of straining zones 18, are provided they are generally equally spaced apart about body region 16.

Figure 3:
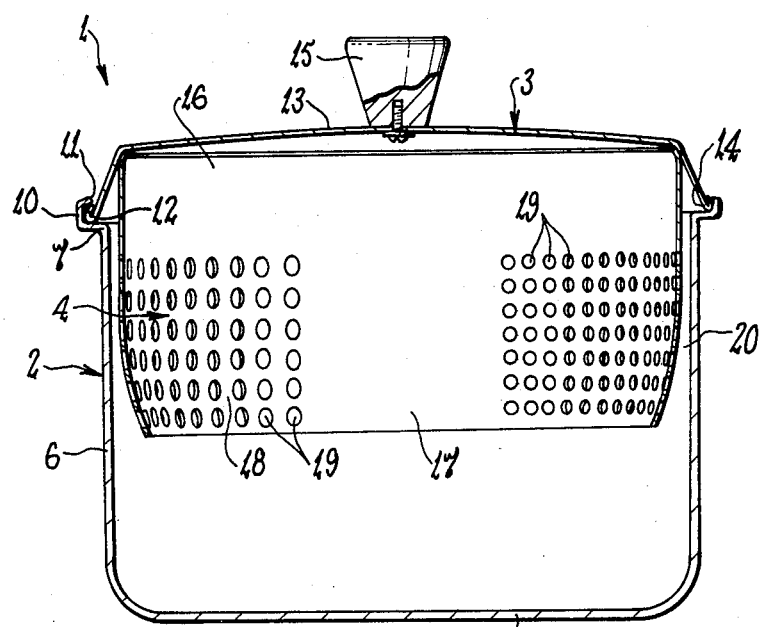
FIG. 3 is a cross-sectional side view on line III—III of the combination of FIG. 1 with the vessel completely closed.

As particularly illustrated in FIG. 3, straining skirt 4, is shaped and sized so that when lid 3, completely closes vessel 2, skirt 4, is located within vessel 2, and is also spaced inwardly from side wall 6, so forming clearance 20. In this way, lid 3, with straining skirt 4, can be lifted straight out of vessel 2, to completely open vessel 2, and that can be achieved without either body region 16, or terminal edge region 17, binding with side wall 6. That clearance 20, also enables lid 3, and straining skirt 4, to be moved laterally as necessary to release peripheral edge region 14, from beneath lip 10, at locations 11, during removal or placement of lid 3. As an example, with vessel 2, having an internal diameter of about 150 mm, clearance 20, may be about 3 mm. Thus, combination 1, can be used in a normal manner with lid 3, being placed on and removed from vessel 2, straining skirt 4, being ineffective but not hindering such use.

Figure 5:
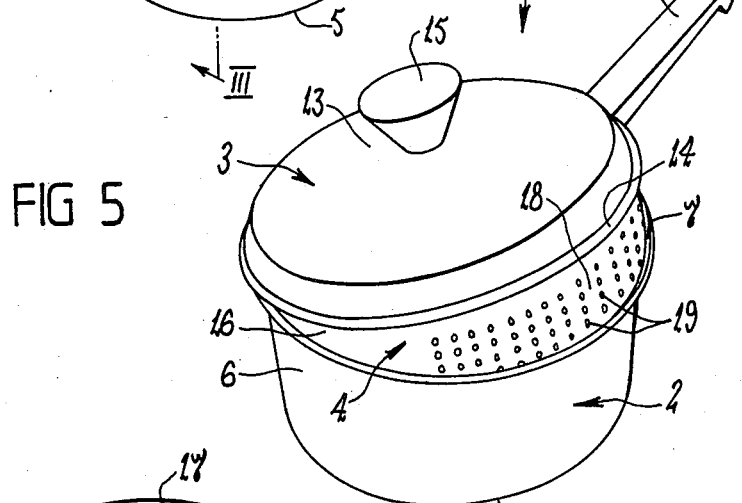
Figure 4:
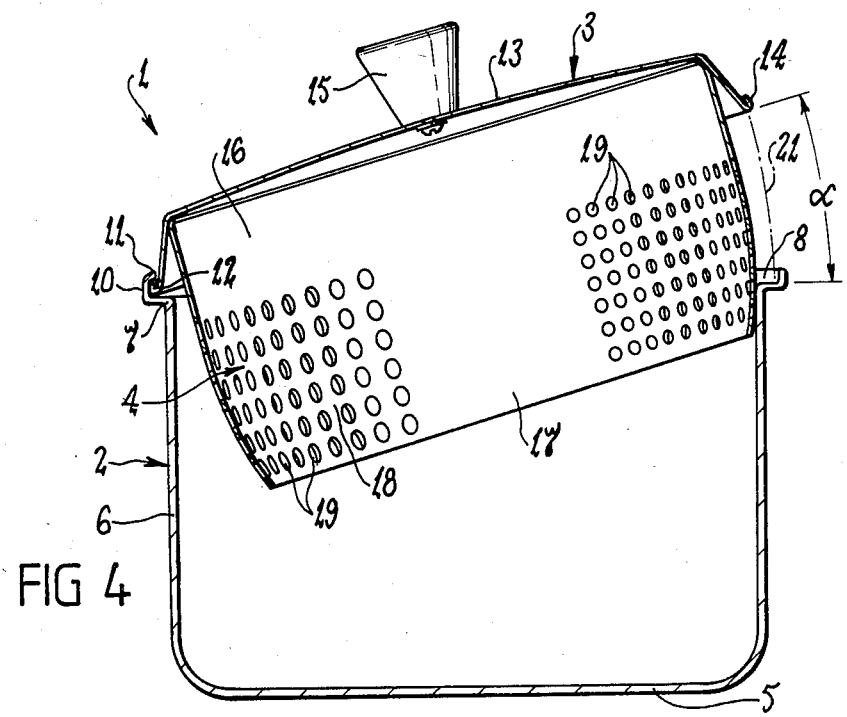
FIG. 4 is the same cross-sectional side view of the combination as shown in FIG. 3 but with the vessel partially open; and, FIG. 5 is a top perspective view of the combination as shown in FIG. 4.

Referring now to FIGS. 4 and 5, it will be seen that straining skirt 4, can be used in combination 1, to strain contents within vessel 2. To enable that straining, lid 3, closing vessel 2, is initially rotated until a selected straining zone 18, is located diametrically opposite a location 11. Lid 3, is then pivoted through angle α, away from vessel 2, about a portion of peripheral edge region 14, which lies adjacent that location 11. Rim 7, at location 11, acts as a fulcrum during that pivoting. Shaping and sizing of straining skirt 4, is such that, during pivot, body region 16, generally remains spaced from side wall 6, and so moves unhindered through top opening 8. However, that shaping and sizing is also such that terminal edge region 17, immediately beneath straining zone 18, moves through arcuate plane 21, extending tangentially to side wall 6, adjacent rim 7. In this way, as terminal edge region 17, approaches rim 7, it interferingly engages side wall 6, face-to-face beneath selected straining zone 18. The remainder of terminal edge portion 17, will generally be shaped and sized so as to avoid interference with side wall 6, although may be touching one another or closely spaced apart. That engagement pushes peripheral edge region 14, against shoulder 12, so that peripheral edge region 14, is held between lip 10, and rim 7, and lid 3, together with straining skirt 4, are generally jammed between shoulder 12, and side wall 6, adjacent rim 7. As a result, lid 3, and terminal edge region 17, are positively held in this position partially opening vessel 2.

During pivoting of lid 3, straining zone 18, moves out of vessel 2, so as to extend between rim 7, and peripheral edge region 14. Although pivot angle α of lid 3, may vary as desired, in this embodiment angle α may be between about 12° and 14°.

With lid 3, and straining skirt 4, jammed partially opening vessel 2, handle 9, may be gripped and vessel 2, together with lid 3, and straining skirt 4, tilted so that selected straining zone 18, faces downwardly and liquid contents within vessel 2, drains through straining apertures 19. The engagement or close spacing between straining skirt 4, and side wall 6, prevents solid contents within vessel 2, from escaping. In general those solid contents will collect within straining skirt 4.

To subsequently completely open vessel 2, lid 3, is initially repivoted to close vessel 2, and then lifted clear of vessel 2, in a usual manner described previously.

Where a plurality of shoulders 12, are provided then vessel 2, may be tilted in different directions. This will also allow vessel 2, to be readily used by both left and right handed persons tilting vessel 2, in opposite directions.

Although not shown lid 3, may be provided with indicia to ensure that a selected straining zone 18, is oppositely aligned to shoulder 12, prior to pivoting of lid 3, to partially open vessel 2.

The various components of combination 1, may be manufactured from any suitable material utilising any suitable manufacturing process. In that regard, those components may generally be fabricated from metal such as stainless steel, although handles 9, and 15, may be composed of heat insulative material such as plastic.

The combination according to the present invention allows proper and complete straining of contents within a vessel. That can be achieved easily in a manner which keeps a user's hands generally clear of the vessel and lid. The combination is particularly suitable for use by persons with limited hand manipulative skills.

In addition, the combination of the present invention allows vessel content straining to be achieved single handedly. This frees one hand for alternative chores that may be associated with the straining process.

The combination of the present invention is relatively simple in construction. As such, cost of manufacture of the combination are unlikely to be significantly different from those of merely a vessel and lid.

It will be appreciated that various modifications and/or alterations may be made to the combination without departing from the present invention as defined in the claims appended hereto.

Having now described out invention, what we claim as new and desire to secure by Letters Patent is:

1. A combination for a vessel having at least one side wall and a rim extending about the side wall defining a top opening of the vessel, the combination including: a lid for covering the top opening to close the vessel, the lid having a peripheral edge region bearing on the rim when closing the vessel; and, a straining element extending at least partially about the lid adjacent the peripheral edge region and depending from the lid to a terminal edge, the straining element having an outer face providing at least one perforated straining zone through which vessel contents can be strained from the vessel, a peripheral region of the outer face at the terminal edge at least adjacent the straining zone being curved inwardly of the straining zone, the straining element being spaced substantially inwardly and clear of the vessel side wall when the lid closes the vessel whereby the lid can be lifted clear of the vessel without interfering engagement between the straining element and vessel to completely open the vessel, and whereby the lid can also be pivoted away from the vessel to partially open the vessel, the lid being pivotable about a portion of the peripheral edge region located across the lid from the straining zone with the rim acting as a fulcrum for the peripheral edge region, pivoting of the lid causing the straining zone to arcuately swing out of the vessel until the inwardly curved outer face region of the straining element adjacent the straining zone interferingly engages the vessel side wall in face-to-face relationship so that the straining zone generally extends between the pivoted lid and parially open vessel, whereupon the vessel together with the lid and straining element can be tilted to strain vessel contents through the straining zone.

2. A combination, including: a vessel having at least one side wall and a rim extending about the side wall defining a top opening of the vessel; a lid for covering the top opening to close the vessel, the lid having a peripheral edge region bearing on the rim when closing the vessel; and, a straining element extending at least partially about the lid adjacent the peripheral edge region and depending from the lid to a terminal edge, the straining element having an outer face providing at least one perforated straining zone through which vessel contents can be strained from the vessel, a peripheral region of the outer face at the terminal edge at least adjacent the straining zone being curved inwardly of the straining zone, the straining element being spaced inwardly and clear of the vessel side wall when the lid closes the vessel whereby the lid can be lifted clear of the vessel without interfering engagement between the straining element and vessel to completely open the vessel, and whereby the lid can also be pivoted away from the vessel to partially open the vessel, the lid being pivotable about a portion of the pepripheral edge region located across the lid from the straining zone with the rim acting as a fulcrum for the peripheral edge region, pivoting of the lid causing the straining zone to arcuately swing out of the vessel until the inwardly curved outer face region of the straining element adjacent the straining zone interferingly engages the vessel side wall in face-to-face relationship zone generally extends between the pivoted lid and partially open vessel, whereupon the vessel together with the lid and straining element can be tilted to strain vessel contents through the straining zone.

3. The combination as claimed in claim 1 or claim 2, wherein the inwardly curved outer face region of the straining element interferingly engages the vessel side wall adjacent the rim upon pivoting of the lid to partially open the vessel.

4. The combination as claimed in claim 3, wherein the inwardly curved outer face region of the straining element extends peripherally along the entire terminal edge.

5. The combination as claimed in claim 2, wherein the vessel further has an abutment shoulder provided adjacent the rim, the portion of peripheral edge region about which the lid can be pivoted being located immediately adjacent the shoulder so that, upon pivoting, the peripheral edge region abuts against the shoulder and the inwardly curved outer face region of the straining element adjacent the straining zone engages the vessel side wall to jam the lid and straining element between the shoulder and side wall, thereby to positively hold the lid in a position partially opening the vessel.

6. The combination as claimed in claim 5, wherein the shoulder is provided by a lip projecting upwardly from the rim and inwardly toward the top opening so that, when the lid is in position partially opening the vessel, the peripheral edge region of the lid is held securely between the lip and rim.

7. The combination as claimed in claim 1 or claim 2, wherein the straining element is a straining skirt, and the or each straining zone comprises a set of apertures in the skirt through which vessel contents can be drained.

8. The combination as claimed in claim 1 or claim 2, wherein the straining element extends at least about halfway about the peripheral edge region of the lid, and a single straining zone is provided centrally of the straining element.

9. The combination as claimed in claim 1 or claim 2, wherein the straining element extends entirely about the peripheral edge region of the lid, and at least two straining zones are provided at equally spaced locations about the straining element, the lid being locatable on the vessel to allow straining of vessel contents through any one selected straining zone.

10. A combination, including: a vessel having at least one side wall, a rim extending about the side wall, defining a top opening of the vessel, and an abutment shoulder provided adjacent the rim; a lid for covering the top opening to close the vessel, the lid having a peripheral edge region bearing on the rim when closing the vessel; and, a straining skirt extending about the lid adjacent the peripheral edge region and depending from the lid to a terminal edge, the straining skirt having an outer face providing at least one perforated straining zone through which vessel contents can be strained from the vessel, a peripheral region of the outer face at the terminal edge at least adjacent the straining zone being curved inwardly of the straining zone, the straining skirt being spaced inwardly and clear of the vessel side wall when the lid closes the vessel whereby the lid can be lifted clear of the vessel without interfering engagement between the straining skirt and vessel to completely open the vessel, and whereby the lid can also be pivoted away from the vessel to partially open the vessel, the lid being pivotable about a portion of the peripheral edge region located immediatedly adjacent the abutment shoulder and across the lid from the straining zone with the rim acting as a fulcrum for the peripheral edge region, pivoting of the lid causing the peripheral edge region to abut against the shoulder and also causing the straining zone to arcuately swing out of the vessel until the inwardly curved outer face region of the straining skirt adjacent the straining zone interferingly engages the vessel side wall in face-to-face relationship so that the lid and straining skirt are jammed between the shoulder and side wall thereby to positively hold the lid in a position partially opening the vessel with the straining zone generally extending between the pivoted lid and partially open vessel, whereupon the vessel together with the lid and straining skirt can be tilted to strain vessel contents through the straining zone.

* * * * *